United States Patent [19]

Oosaka

[11] Patent Number: 5,659,354
[45] Date of Patent: Aug. 19, 1997

[54] FILM IMAGE INPUT METHOD

[75] Inventor: Shigenori Oosaka, Asaka, Japan

[73] Assignee: Fuji Photo Film Co., Ltd., Kanagawa, Japan

[21] Appl. No.: 378,372

[22] Filed: Jan. 25, 1995

[30] Foreign Application Priority Data

Jan. 31, 1994 [JP] Japan ................... 6-009060

[51] Int. Cl.$^6$ ............................ H04N 7/18
[52] U.S. Cl. .................................. 348/96
[58] Field of Search ............... 348/96, 97; H04N 7/18

[56] References Cited

U.S. PATENT DOCUMENTS

| | | | |
|---|---|---|---|
| 4,141,735 | 2/1979 | Schrader | 430/141 |
| 5,032,855 | 7/1991 | Taniguchi et al. | 354/21 |
| 5,142,310 | 8/1992 | Taniguchi et al. | 348/96 |
| 5,179,409 | 1/1993 | Kazami et al. | 355/75 |
| 5,309,242 | 5/1994 | Asami et al. | 348/97 |
| 5,368,894 | 11/1994 | Lammers | 427/407.1 |
| 5,389,966 | 2/1995 | Ikari et al. | 348/98 |
| 5,541,644 | 7/1996 | Nanba | 348/96 |

FOREIGN PATENT DOCUMENTS

| | | |
|---|---|---|
| 50-81325 | 7/1975 | Japan . |
| 63-39267 | 2/1988 | Japan . |
| 1279250 | 11/1989 | Japan . |
| 1289948 | 11/1989 | Japan . |
| 5-22656 | 1/1993 | Japan . |
| 5-56345 | 3/1993 | Japan . |
| 5-75922 | 3/1993 | Japan . |
| WO9004301 | 4/1990 | WIPO . |

*Primary Examiner*—Howard W. Britton

[57] ABSTRACT

A photo film, which is hard and has a little winding peculiarity and which is excellent in dynamic intensity, is used, whereby film feeding problems, which easily occur when a line sensor is used, are reduced. A long roll of a developed photo film for still photography, which is loaded between a feeding side and a winding side, is fed at a constant speed between the feeding side and the winding side, so that the image data are taken in through a line sensor. Before taking in the image data of the desired frame, first, a taking environment such as a brightness and a white balance of every frame is detected during the first feeding of the photo film. And, when one frame is reproduced, the image data of the desired frame are taken in through the line sensor during the second feeding of the photo film, and further, an exposure, a white balance and the like are adjusted in accordance with the detected taking environment of said frame when the image data are taken in. The base of the photo film used in the film image input method is polyethylene-naphthalate, and more preferably, is heat treated at more than 50° C. and less than the glass transition temperature for 0.1–1500 hours.

16 Claims, 5 Drawing Sheets

FIG.4

( FILM LOADING )

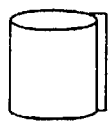
READING MAGNETIC
INFORMATION
· AE/AWB INFORMATION
HIGH SPEED FEEDING:148.0mm/S → MAGNETIC
16 TIMES (ABOUT 10SEC) INFORMATION
AE/AWB
REWINDING INFORMATION
← HIGH SPEED FEEDING:148.0mm/S PROCESSING
16 TIMES (ABOUT 10 SEC)

MAKING INDEX
IMAGES
· AE/AWB INFORMATION
HIGH SPEED READING:74.0mm/S → AE/AWB
8 TIMES (ABOUT 20SEC) INFORMATION
PROCESSING
REWINDING FOR
← HIGH SPEED FEEDING:148.0mm/S CONFIRMATION
16 TIMES (ABOUT 10SEC)

READING IMAGE
NORMAL:9.25mm/S LOW SPEED:4.63mm/S →
(3SEC/A FRAME) (6SEC/A FRAME)
1 TIME 1/2 TIME

END REWINDING
PROCESS ← HIGH SPEED FEEDING:148.0mm/S(ABOUT 10SEC)
16 TIMES
REWRITING MAGNETIC INFORMATION
HIGH SPEED FEEDING:148.0mm/S(ABOUT 10SEC) →
16 TIMES

REWINDING
← HIGH SPEED FEEDING:148.0mm/S(ABOUT 10SEC)
16TIMES ( PICKING FILM OUT )

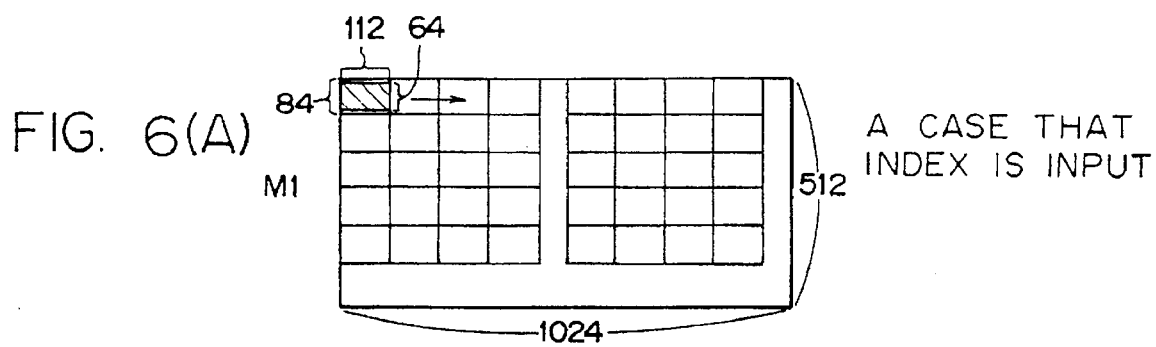
FIG. 6(A)  A CASE THAT INDEX IS INPUT
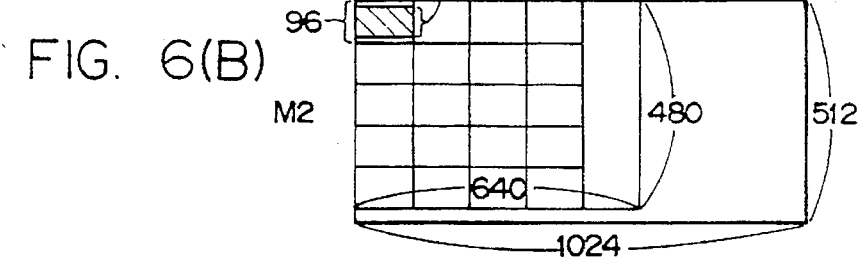
FIG. 6(B)  ENLARGE TRANSFER
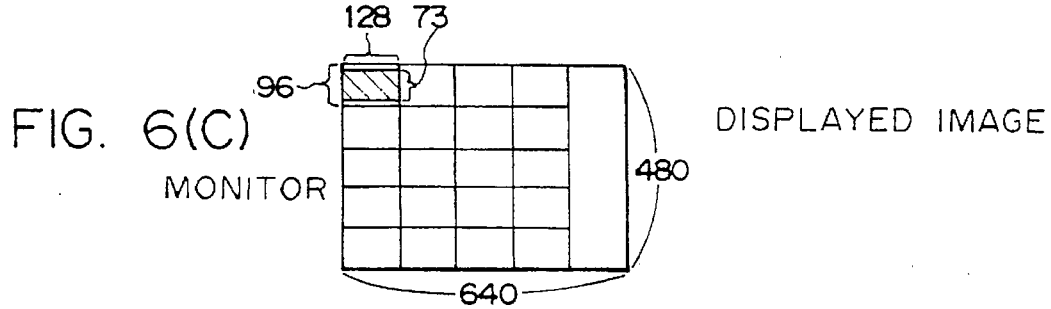
FIG. 6(C)  DISPLAYED IMAGE
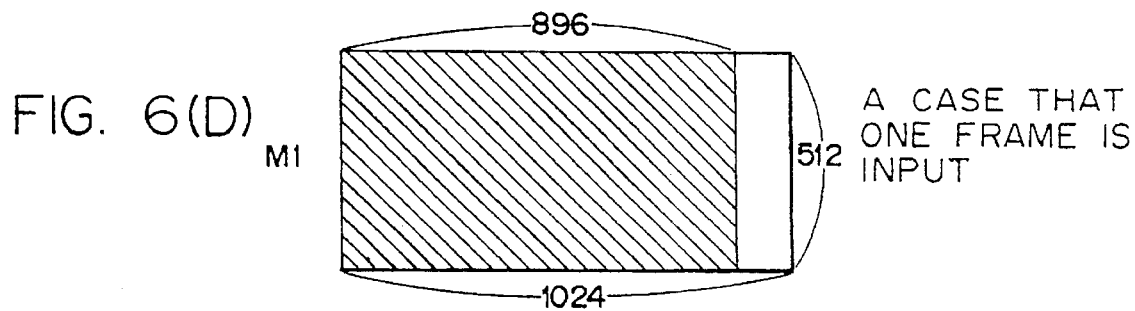
FIG. 6(D)  A CASE THAT ONE FRAME IS INPUT

FILM IMAGE INPUT METHOD

BACKGROUND OF THE INVENTION

1. Field of the Invention

The present invention relates to a film image input method, more particularly to a film image input method wherein an image of a developed film for still photography is focused on an image sensor through a taking lens and image signals, which are transferred photoelectrically by the image sensor, are output to a TV monitor, whereby the image of the film is replayed on the TV monitor.

2. Description of the Related Art

Conventionally, a film image input system wherein a developed film for still photography is focused on an image sensor such as a CCD and an image of the film is transferred into image signals, thereafter, the image signals are output to the TV monitor and the image of the film is displayed, is disclosed in WO90/04301, Japan Patent Application Laid-Open No.5-75922, Japan Patent Application Laid-Open No.5-56345, Japan Patent Application Laid-Open No.5-22656 and the like.

WO90/04301 discloses a camera and a film image input system which use a photo film provided with a magnetic recording track, and Japan Patent Application Laid-Open No.5-75922 discloses a film image input system which uses a film cartridge wherein a developed film for still photography is wound round a single spool.

Japan Patent Application Laid-Open No.63-39267 discloses an image reading system wherein the sub scanning is moved continuously to read the image recorded on the film with a line sensor such as a CCD sensor (lines 16–18, left bottom column, page 1). And, this publication has given a description in that the density of the film image and the base density of the film are detected from the reading output which is understood by the pre-scanning of the image by the CCD before the main reading and then the threshold to the comparator 8 is set by the CPU 2 (lines 11–15, right upper column, page 2). That is, when the film image is read by the line sensor, the film image is pre-scanned to read information such as the brightness of the film image, and then, while main-scanning, the CCD output is quantized such as binarized by the threshold in accordance with the information.

Now, triacetylcellulose (TAC) or polyethylene terephthalate (PET) is used for the base of the conventional photo film. There is no problem when the photo film is normally used in a camera, however, when the photo film is used in the film image input system, there is a problem in that both of TAC and PET tend to have a winding peculiarity and there is another problem about the dynamic intensity of TAC. That is, when the film, which is loaded between the supplying side and the winding side, is supplied between the supplying side and the winding side, no winding peculiarity and a strong dynamic intensity (particularly, tear intensity) are required for the film. Particularly, there are problems in that the winding peculiarity, which is generated in a state that the film is stored in the film cartridge, is apt to cause a jamming during the supplying of the film and the insufficiency of the dynamic intensity is apt to cause film damage such as a tear while it is being supplied.

And, the film image input system described in WO90/04301 and the like uses a two-dimensional image sensor as an image sensor and the film is supplied one frame at a time intermittently, therefore, the supply speed is not a problem. However, as described in Japan Patent Application Laid-Open No.63-39267, when the film image, which is supplied continuously, is read by the line sensor, the supply speed of the film must be kept constant, and the image data can not be obtained at a real time like two-dimensional image sensor, therefore, a pre-scanning is needed before a main-scanning and the film must be supplied frequently and repeatedly.

Therefore, the photo film for the image reading system using a line sensor is required to be hard enough to have a winding peculiarity, to have a strong dynamic intensity and to bear being used repeatedly.

SUMMARY OF THE INVENTION

The present invention has been developed to eliminate the above-described problems and has as its aim the provision of a film image input method wherein the film supply troubles, which tend to occur when a line sensor is used as an image sensor, can be reduced.

To achieve the above-described object, in a film image input method comprising a film feeder for feeding a long roll of a developed film for still photography, which is loaded between a feeding side and a winding side, between said feeding side and said winding side and a line sensor for reading a film image while feeding a film by said film feeder, detecting a taking environment of every frame in accordance with image data read through said line sensor during a first feeding of said film, and adjusting to read image data of a desired frame in accordance with a detected taking environment of said desired frame through said line sensor during a second feeding after detecting said taking environment; a base of said film used in said film image input system comprises poly-ethylene-naphthalate.

According to this invention, a line sensor is used instead of an expensive two-dimensional image sensor, and a long roll of a developed film for still photography loaded between a feeding side and a winding side is fed at a constant speed between said feeding side and said winding side whereby image data are taken in through said line sensor. Before taking the image data of the desired frame in, first, a taking environment such as a brightness and a white balance for every frame during the first feeding of said film is detected. And, when one frame is reproduced, the image data of the desired frame are taken in during the second feeding of said film, and further, before taking in the image data, an exposure, a white balance and the like are adjusted in accordance with the detected taking environment of said frame. Moreover, the base of the photo film used in the film image input method is poly-ethylene-naphthalate, more preferably, the base is heat treated more than 5° C. and less than a glass transition temperature for 0.1–1500 hours. That is, the photo film manufactured as above described is hard enough to have a winding peculiarity, which has a strong dynamic intensity and becomes to be bearable for repeated usage, therefore, troubles such as a jamming during the film feeding and a film cutting can be reduced very much.

BRIEF DESCRIPTION OF THE DRAWINGS

The exact nature of this invention, as well as other aims and advantages thereof, will be readily apparent from consideration of the following specification relating to the accompanied drawings, which are given by way of illustration only, and thus are not limitative of the present invention, in which like reference characters designate the same or similar parts throughout the figures thereof and wherein:

FIG. 4 is a view showing an example of the feeding sequence of the film which is fed in the film image input method according to the present invention;

FIG. 6(B) is a view showing a memory area in a display buffer, FIG. 6(C) is a view showing an image displayed on the TV monitor and FIG. 6(D) is a view showing a memory area of one frame in a CCD buffer of the film image input system shown in FIG. 1.

DESCRIPTION OF THE PREFERRED EMBODIMENT

A detailed description will hereafter be given of the preferred embodiment of a film image input method according to the present invention with reference to the accompanying drawings.

Figure 1:
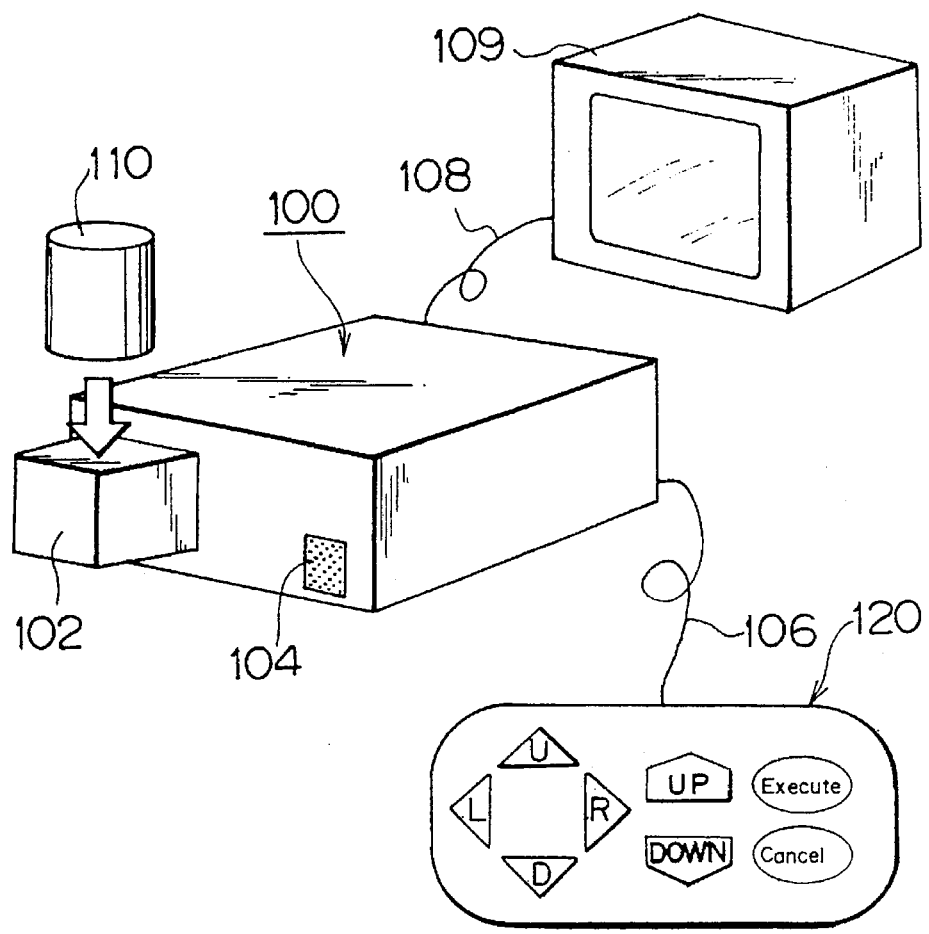
FIG. 1 is a perspective view showing the schematic structure of a whole system including a film image input system according to the present invention.

FIG. 1 is a perspective view showing the schematic structure of a whole system including a film image input system applied with the method according to this invention. As shown in FIG. 1, a film image input system 100 is shaped in a rectangular parallelepiped, and a film cartridge tray 102 and a power switch 104 are provided at the front thereof. The film cartridge tray 102 is driven back and forth during the loading/unloading of a film cartridge 110, whereby the film cartridge 110 can be stored or taken out.

A key pad 120 and a TV monitor 109 are connected to the film image input system 100, and various control signals, which control the film image input system 100, are output from the key pad 120 to the film image input system 100 through a signal cable 108 and video signals are output from the film image input system 100 to the TV monitor 109 through a signal cable 108.

Figure 2:
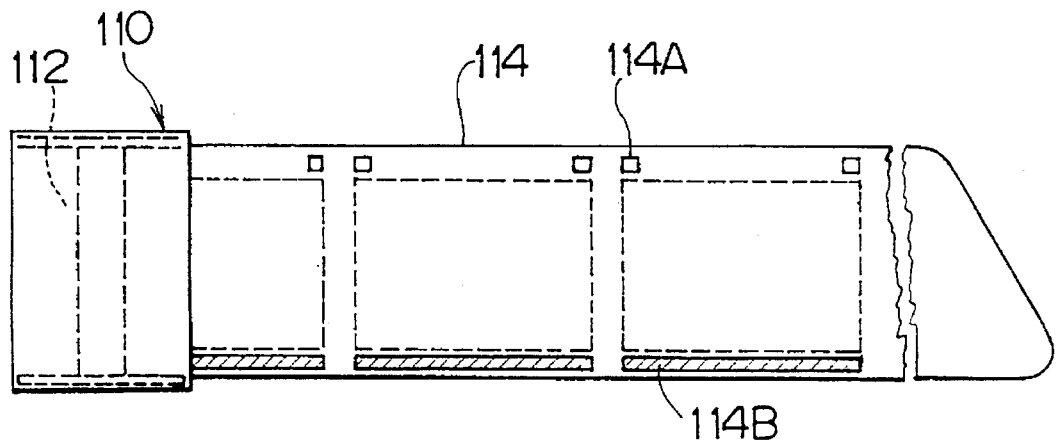
FIG. 2 is a view showing an example of a film cartridge employed in the film image input system shown in FIG. 1.

The film cartridge 110 has a spool 112, as shown in FIG. 2, and a film 114 is wound around the spool 112. In the film 114, perforation 114A, which indicates a frame position, is projected and a magnetic recording layer 114B, on which magnetic data showing photographing data of every frame can be recorded by a camera having a magnetic head, is placed on the whole or at the edge of the film. Further, the developed film 114 is wound in the film cartridge 110 to thereby be kept.

Next, a detailed description will be given of the film 114.

It is desirable that the base of the film 114 is substantial polyethylene naphthalate (hereunder, called PEN). PEN is harder than TAC and PET, which are materials for the conventional film base, so it is more difficult for PEN to have a winding peculiarity. One of factors is the glass-transition temperature (hereunder, called Tg). And, PEN has a greater dynamic character such as a tear intensity than TAC.

Substantial PEN may be a copolymer or a blend such as a polymer blend or laminator, that is, the weight of PEN components (naphthalene di-carboxylic acid, ethylene glycol) is more than half. When a copolymer is used, terephtalic acid is desirable as di-carboxylic acid, and bisphenol A or cyclohexane di-methanol is preferred as diol. When a blend is used, PET, poly cyclohexane terephthalate, polycarbonate or polyallylate is preferred. The film of the PEN base can be manufactured by the method disclosed in Japan Patent Application Laid-Open No.50-81325.

The PEN base is applied with the 50°–Tg heat treatment for 0.1–1500 hours as disclosed in U.S. Pat. No. 4,141,735, whereby the PEN base can become harder and it is more difficult to have a winding peculiarity.

The Tg can be obtained with a differential scanning calorimeter (DSC). That is, a sample 10 mg in nitrogen is increased in temperature by 20° C./min. to 300° C. and then decreased to room temperature, thereafter, the temperature is increased by 20° C./min again. The Tg can be obtained as an arithmetical average between the temperature at starting of separation from the base line and the temperature at returning to the new base line. The heat treatment temperature is more than 50° C. and less than Tg, more desirably, more than Tg–20° C. and less than Tg° C. When the heat treatment is performed less than 50° C., it takes a long time to remove a winding peculiarity efficiently, therefore, the industrial productivity is lowered. And, when more than Tg, the film can not sufficiently obtain the effect to have no winding peculiarity.

The heat treatment may be performed at a constant temperature within the above range, and the heat treatment may be performed while cooling. When cooling, the average cooling speed is from –0.01° to –20° C./hour, more desirably, from –0.1° to –5° C./hour. When the heat treatment time is less than 0.1 hour, enough effect cannot be obtained sufficiently, and when more than an hour, the effect is saturated and the base tends to be colored and/or to be breakable.

Further, in order to increase the effect that the base has a little winding peculiarity, it is preferable that a heat treatment is applied to the base at a temperature more than Tg and less than the melting point (the melting temperature obtained by DSC) before the above heat treatment (hereunder, called pre-heat-treatment) to cancel the heat history of the base, and then a heat treatment is applied at a temperature more than 50° C. and less than Tg (hereunder, after-heat-treatment).

The preferred method of the pre- and after- heat treatment is that the pre-heat-treatment is performed at a constant temperature more than Tg+20° C. and less than the crystallization temperature and then the after-heat-treatment is performed while cooling to the temperature range from Tg to Tg–20° C. at the cooling speed from –0.1° to –5° C./hour.

The base may be heat treated in a roll or in a web while being conveyed.

In the heat treatment in a roll, a heat contraction stress occurs during the heat treatment, therefore, it is easy to cause creases by gripping and/or surface condition troubles such as a sectional taking of the winding center. Thus, it is desirable that the surface is made uneven (for example, conductive inorganic grains such as $SnO_2$ and $SbO_2$ are put on) to remove creaks of the base, whereby the creases by gripping are prevented, and a knurl is made at the end of the base to heighten only the end, whereby the sectional taking of the winding center is prevented.

In the heat treatment in a web, a lot of steps for the after-heat-treatment are required, however, the base surface condition is better than the heat treatment in a roll. The most preferable heat treatment is that the pre-heat-treatment is performed in a web and the after-heat-treatment is performed in a roll, because the pre-heat-treatment is harder and has less surface condition troubles than in a roll and it takes a longer time for the after-heat-treatment.

The heat treatment may be applied at any step between for manufacturing a film of the base and for putting a sensitive layer on, more preferably, after putting an antistatic agent on. It can prevent the film from adhering dusts by electrification, and which cause surface condition troubles of the base during the heat treatment.

A photo film is made by putting a subbing layer, a back layer, a sensitive layer and the like on the PEN base, and the method thereof is described in Japan Patent Application No. 4-219569.

In a camera which uses the film cartridge 110, various magnetic data can be recorded in the magnetic record layer 114B of the film 114 for every frame by the magnetic head built in the camera. The magnetic data to be recorded are such as a frame number, a print format indicating one of a high-vision image, a panoramic image and an usual image and a photographing date/time, further, many various data can be recorded in accordance with the kind of camera. And, a bar cord indicating a film type, a frame number and the like can be optically recorded outside the frame to be exposed by the object light.

Figure 3:
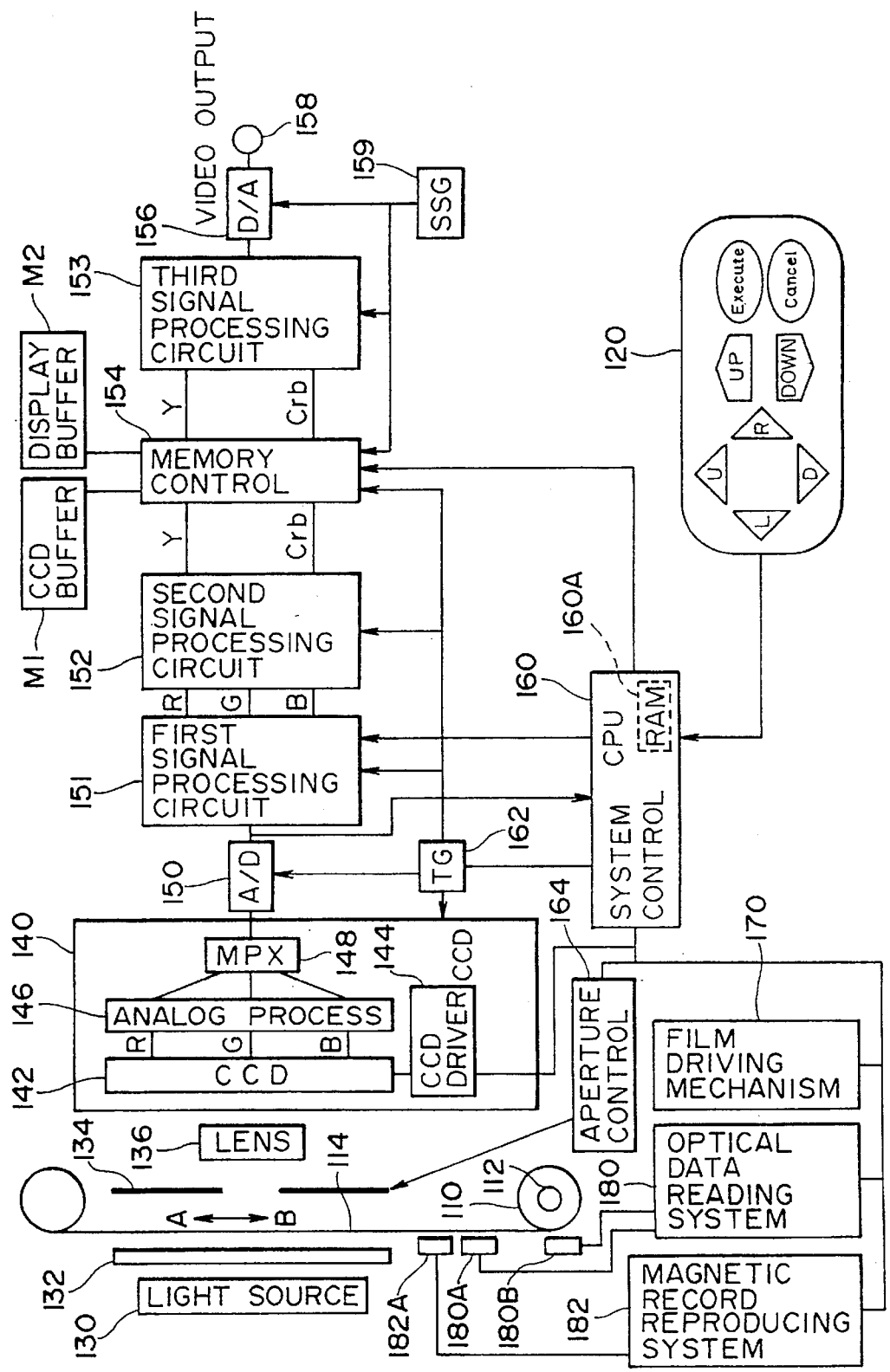
FIG. 3 is a block diagram showing an embodiment of an internal structure of the film image input system shown in FIG. 1.

FIG. 3 is a block diagram showing an embodiment of the internal structure of the film image input system 100. The film image input system 100 comprises a light source 130 for lighting, a taking lens 136, a CCD circuit unit 140 including a CCD line sensor 142, a first signal processing circuit 151, a second signal processing circuit 152, a third signal processing circuit 153, a memory control circuit 154, a CCD buffer M1, a display buffer M2, a central processing unit (CPU) 160, a film driving mechanism 170, an optical data reading system 180, a magnetic record reproducing system 182 and the like.

The light source 130 consists of, for example, a fluorescent light which is in a longitudinal direction perpendicular to the feeding direction of the film 114, and illuminates the film 114 through an infrared light cutting filter 132. The image light which permeates through the film 114 is focused on the light receiving surface of the CCD line sensor 142 through the taking 136 lens with a single focal point. And, the film 114 is moved in the direction of the arrow A (hereunder, the sequential direction) or in the direction of the arrow B (hereunder, the reverse direction) by the film driving mechanism 170 when the film image is picked up by the CCD line sensor 142, and a detailed description as to the film driving will be given later.

The CCD line sensor 142 is placed in the direction perpendicular to the film feeding direction. And, the image light focused on the light receiving surface of the CCD line sensor 142 is charged and stored at each sensor which has a R, G or B filter for a predetermined time, and converted to signal charges of R, G or B in accordance with the intensity of the light. The stored signal charges are read out to a shift resistor in accordance with a lead gate pulse having a predetermined cycle provided from the CCD driving circuit 144, and is read by the resistor transmitting pulse, sequentially.

The CCD line sensor 142 has, for example, sensors for 1024 picture elements in the direction perpendicular to the film feeding direction. Further, when the cycle of the lead gate pulse or the like is unchanged, the number of the picture elements in the film feeding direction of one frame varies in accordance with the film feeding speed. In this embodiment, when the film feeding speed is a half, one, eight and sixteen times the standard speed, the number of the picture elements is 1792, 896, 112 and 56, respectively.

As described above, the signal charges which are read from the CCD line sensor 142 are clamped with a CCD clamp and inputted to an analog processing circuit 146 as the R, G, B signals, and then, the gain and the like of the R, G, B signals are controlled. The R, G, B signals outputted from the analog processing circuit 148 are point-sequenced by a multiplexer 148 and converted to digital signals by an A/D converter 150, thereafter, outputted to the first signal processing circuit 151 and the CPU 160.

The first processing circuit 151 includes a white balance adjustment circuit, a negative-positive changing circuit, a γ-correcting circuit, a RGB synchronizing circuit and the like, and processes the point sequenced R, G, B signals, which are inputted sequentially, in the respective circuits, and then outputs the synchronized R, G, B signals to the second signal processing circuit 152. Further, the white balance adjustment circuit in the first signal processing circuit 151 processes control signals from the CPU 180. A detailed description will be given later.

The second signal processing circuit 152 has a matrix circuit, and produces a luminance signal Y and a chromatic signal Cr/b and outputs them to a memory control circuit 154.

The memory control circuit 154 controls the luminance signal Y and the chromatic signal Cr/b which are written/ read to the CCD buffer M1 and the luminance signal Y and the chromatic signal Cr/b, which is memorized in the buffer M1 and are written/read to the display buffer M2. A detailed description will be given of the controlling of the writing/ reading for the CCD buffer M1 and the display buffer M2, later.

The luminance signal Y and the chromatic signal Cr/b, which are read from the display buffer by the memory control circuit 154, are output to the third signal processing circuit 153. In the third signal processing circuit, color combined image signals of a mode such as NTSC mode, are produced, and then outputted to a video output terminal 158 through the D/A converter 156. Synchronized signals having predetermined cycles are output from a synchronized signal producing circuit 159 to the memory control circuit 154, the third signal processing circuit 153 and the D/A converter 156, respectively, whereby the respective circuits can be synchronized and image signals including required synchronizing signals can be received. And, timing signals, which are controlled by the CPU 160, are output to the CCD circuit unit 140, the A/D converter 150, the first signal processing circuit 151, the second signal processing circuit 152 and the memory control circuit 154 from a timing signal producing circuit 162, respectively, whereby the respective circuits are synchronized.

The film driving mechanism 170 is fixed to the spool 112 in the film cartridge 110 and is composed of a film feeding portion which drives the spool 112 clockwise/ counterclockwise, a film winding portion which winds the film 114 from the feeding portion and means positioned at the film feeding path in that the film 114 is fed at a constant speed by holding the film 114 with a capstan and a pinchroller (not shown).

When the film is loaded after putting the film cartridge 110 at a predetermined position, the film feeding portion drives the spool 112 in the film cartridge 110 clockwise in FIG. 3 to thereby feed the film 114 from the film cartridge 110 until the film leader portion of the film 114 is fed to the position of the capstan, thereafter, the film 114 is fed by the capstan at a constant speed and the leader portion of the film 114 is wound by the film winding portion. And, as described above, when the film 114 is loaded between the film feeding portion and the film winding portion, thereafter, the film is fed and wound between the film feeding portion and the film winding portion.

The optical data reading system 180 is composed of a first optical sensor 180A for optically detecting the perforation 114A of the film 114 and a second optical sensor 180B for optically detecting optical data such as a bar code written at the edge of the film, and then it processes the optical data which are detected by the optical sensors 180A and 180B and then outputs them to the CPU 160.

In the magnetic record reproducing system 182 which has a magnetic head 182A, the magnetic data, which are recorded on the magnetic recording layer 114B of the film 114, are read through the magnetic head 182A, and processed and outputted to the CPU 160 to be recorded in a RAM 160A. Further, the data, which are recorded in the RAM 160A of the CPU 160, are read and converted to signals to be available for magnetic recording, and then outputted to the magnetic head 182A and stored in the magnetic recording layer 114B of the film 114.

Next, the operation of the above-mentioned film image input system 100 will be described.

First, the film cartridge 110 is set in the film cartridge tray 102, and then the film driving mechanism 170 is controlled by the CPU 180 to thereby load the film. That is, the film 114 is fed from the film cartridge 110 and the leader portion of the film is wound around the winding axis of the film winding portion.

When the film loading is completed, the first pre-scan of the film 114 is started. That is, as shown in FIG. 4, the film 114 is fed in the right direction at the high speed, 148.0 mm/s, and then rewound in the reverse direction at 148.0 mm/s. During the first pre-scan in the right direction, the image data are taken through the CCD line sensor 142 and the optical data and the magnetic data are read through the optical data reading system 180 and the magnetic record reproducing system 182.

Next, a description is given of the process based on the image data which are taken during the first pre-scan.

The point-sequenced, R, G, B signals are inputted to the CPU 160 from the A/D converter 150 shown in FIG. 8. In the CPU 160, the R, G, B signals of all the frames are taken, respectively, off-set values of the respective color signals and gain adjustment values of the respective color signals for adjusting white balances are calculated, and then off-set data showing the off-set values of the respective color signals and AWB data showing the gain values are stored in the RAM 160A built in the CPU 160 for every frame. Further, AE data, which shows the brightness of every frame from the R, G, B signals of every frame, are stored in the RAM 160A. And, the CPU 160 can detect every frame based on the optical/magnetic data, which are inputted through the optical data reading system 180 and the magnetic record reproducing system 182, and can also detect the frame number by counting frames.

Then, the second pre-scan of the film 114 is performed. That is, as shown in FIG. 4, the film 114 is fed in the right direction at the high speed, 74.0 mm/s again, and then rewound in the reverse direction at 148.0 mm/s. During the second pre-scan in the right direction, the image data are taken through the CCD line sensor 142 again. The CPU 160 controls an aperture 134 for every frame based on the AE data stored in the RAM 160A through an aperture control system 164 during the taking of the image data. Further, when a sensor having an electric shutter mechanism is used as the CCD line sensor 142, the charge storage time in the CCD line sensor 142 is controlled through the CCD driving circuit 144, whereby exposure values can be adjusted, and as a result, the aperture 134 and the aperture control system 164 are not needed.

And, the off-set values and the white balance of the R, G, B signals are adjusted for every frame in the first signal processing circuit 151 by the CPU 160. That is, the CPU 160 outputs the off-set data, which are stored in the RAM 160A, of the respective frames and of the respective color signals to the first signal processing circuit 151, and then the off-set value of the point sequenced R, G, B signals are adjusted based on the off-set data in the first signal processing circuit 151. Similarly, the CPU 160 outputs the AWB data, which are stored in the RAM 160A, of the respective frames and of the respective color signals to the first signal processing circuit 151, and then the gain of the point sequenced R, G, B signals is adjusted based on the AWB data in the first signal processing circuit 151.

The image data of each frame are adjusted in accordance with the AE data, the AWB data and the like, therefore, fine image data can be taken whether or not the taking condition of each frame is good.

The adjusted image data of each frame, that is, the luminance signal Y and the chromatic signal Cr/b, which are outputted from the second signal processing circuit 152, are stored sequentially in the CCD buffer M1 through the memory control circuit 154. And, the film 114 is fed at a speed eight times as fast as the feeding speed during the taking of the standard film image, therefore, the number of the picture elements of one frame in the film feeding direction is 112, as shown in FIG. 6(A). And, the CCD line sensor 142 has 1024 picture elements in the direction perpendicular to the film feeding direction, however, the number of the picture elements of one frame in the direction perpendicular to the film feeding direction is reduced by one sixteenth to thereby be 64. And, the CCD buffer M1 has a capacity for storing the data of 512×1024 picture elements, as shown in FIG. 6(A), therefore, the image data of 5×4×2 (=40) frames can be stored. That is, the image data showing the index images for 40 frames are stored in the CCD buffer M1.

The CCD buffer M2 has a capacity for storing the data of 512×1024 picture elements, as shown in FIG. 6(B). When the image data showing the index images are stored, the number of the picture element in one frame is enlarged to be 73×128 and the image data for 5×4 (=20) frames can be stored. Then, when the index image is displayed on the TV monitor 109, the upper left area in the display buffer M2 of 480×640 picture elements are read (see FIGS. 6(B) and 6(C)).

Now, in the CCD buffer M1, as shown in FIG. 6(A), the image data of the respective frames are stored sequentially from the upper left to the right of the memory area in such an order that the image data of each frame during the scan are read, and when the image data for 4 frames are stored, the following data are stored at the memory area of the next line from the left to the right, sequentially. Then, when the image data for 5 lines (4×5=20 frames) are stored, the following image data are stored in the next memory for 20 frames.

The contents stored in the CCD buffer M1 are transferred to the display buffer M2 while storing contents in the CCD buffer M1, as a result, the frame image is displayed sequentially from the left-upper portion on the TV monitor 109.

The image data are stored in the display buffer M2 for the 20 frames at once, therefore, when the image data of the 21st frame are inputted to the CCD buffer M1, the image data are rewritten and read to the display buffer M2 so as to scroll the index images upward. For example, when the image data of the 21st frame are inputted to the CCD buffer M1, the image data for one line from the first frame to the fourth frame in the display buffer M2 are cleared, and then the image data of the 21st frame are written and the scan starting address while outputting the image signals is changed to the second line. With this arrangement, the index images, which are scrolled upward for one line, are displayed on the TV monitor 109. When the image data of all frames are stored in the CCD buffer M1, the screen of the TV monitor 109 is scrolled downward or changed over to display again the index images of the 1–20 frame numbers.

Now, in the CPU 160, frames are numbered in such an order that the respective image data are read during the scan, that is, 1, 2 . . . , and character signals showing the respective frame numbers are output to thereby display the index images superimposed with the frame numbers.

As stated above, the index images are prepared and displayed on the TV monitor 109, thereafter, required editing and assignments are input with the key pad 120 while monitoring the index images in order to display one frame on the TV monitor 109 with the dialogue operation. For example, the print number for every frame, the length and breadth display for every frame, the display/non-display frame and the like are set.

When the editing with the index images is completed, each frame of the film can be reproduced on the TV monitor 109 one by one or continuously at predetermined intervals in accordance with the edited contents to enjoy the film images. Further, each frame can be edited more in detail (zooming, character inputting, trimming and the like), however, the detailed explanation thereof is omitted here.

Now, when one frame is reproduced from the first frame (frame number 1), as shown in FIG. 4, the film 114 is fed in a sequential direction at 9.25 mm/s by one frame and the frame having the frame number 1 is scanned (the regular scan). The image data are stored in the CCD buffer M1 through the CCD line sensor 142 during this regular scan.

When the image data are stored, the image data of each frame are adjusted based on the AE data, AWB data and the like which are stored in the RAM 160A by the CPU 160, therefore, fine image data can be obtained irrespective of the taking environment of each frame. Further, the number of the picture elements for one frame, which are stored in the CCD buffer M1 as mentioned above, is 512×896, as shown in FIG. 6(D). That is, the output from the CCD line sensor 142 having sensors for 1024 picture elements is thinned out to half, whereby the number of the picture elements in the direction perpendicular to the film feeding direction of one frame is 512, and further, the film feeding speed is reduced to one eighth of that during the taking of the image data of the index images, whereby, the number of the picture elements is 896 picture elements eight times as many as the number of picture elements (112 picture elements) in the same direction of the film feeding direction for one frame of the index images.

The image data, which are stored in the CCD buffer M1 as described above, are transferred to the display buffer M2, and the contents stored in the display buffer M2 are read repeatedly, whereby the image for one frame is displayed on the TV monitor 109.

In this embodiment, the zooming is performed by the electronic zooming. For example, the electronic zooming can cover the range of 0.1–1.5 times. When the magnification of the electronic zooming is 1.5 times and further zooming is required, the regular scan is performed at a low speed. In this case, the film 114 is fed in the sequential direction at 4.63 mm/sec. (half of the usual regular scanning speed) and the CCD output of the CCD line sensor 142 is not thinned down and is taken in while the zooming center indicated by the key pad 120 is a standard. With this arrangement, the image data, which are zoomed twice compared with the usual regular scanning, are taken in. The image data can be zoomed by the electronic zooming to the maximum 3 times.

Now, when reproducing or editing for one frame is completed for all frames, as shown in FIG. 4, the film 114 is rewound at the high speed of 148.0 mm/sec. And then, the film 114 is fed in the right direction at the high speed of 148.0 mm/sec., and the magnetic data which were previously read from the magnetic record layer 114B of the film 114 and stored in the RAM 180A of the CPU, data showing the contents of the editing with the index images, data showing the contents of the editing with the display frames and the like are recorded again in the magnetic record layer 114B of the film 114. Thereafter, the film 114 is rewound at the high speed of 148.0 mm/sec. in the reverse direction, and then the film cartridge 110 is picked up.

Figure 5:
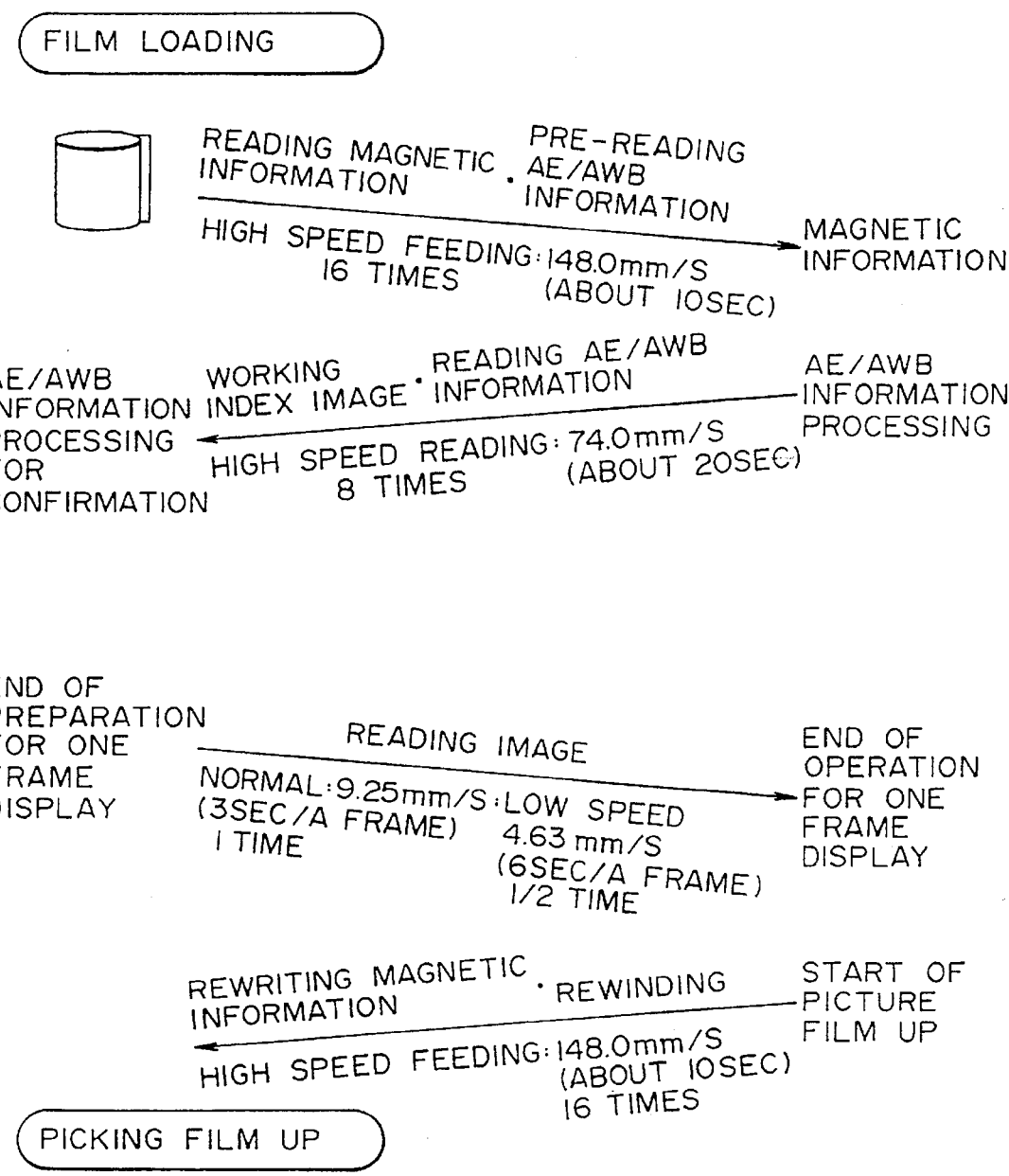
FIG. 5 is a view showing another example of the feeding sequence of the film which is fed in the film image input method according to the present invention; and, FIG. 6(A) is a view showing a memory area in a CCD buffer.

In this embodiment, as shown in FIG. 4, the magnetic data are read/written and the image data are read only during the feeding of the film in the right direction. However, the present invention should not be limited to this, as shown in FIG. 5, because the image data of the index image may be read in and the magnetic data may be written in during the feeding of the film in the reverse direction. This case can shorten the time from the film loading through the editing for every frame to the film picking up. And, in this case, the film feeding direction during the reading of the magnetic data becomes opposite to that during the writing. Therefore, it is necessary to reverse the feeding order of the magnetic data during the writing.

In the film image input system which uses the line sensor, from the fitting of the film cartridge 110 to the picking up, the film 114 must go and return 4 times in the embodiment shown in FIG. 4, and twice in the embodiment shown in FIG. 5. Further, in this embodiment, the film must be fed at a speed of 4.63 mm/sec.–148.0 mm/sec., moreover, at a constant speed while feeding. When the taking environment of each frame for one film, and the index image and the like are taken in, the image quality is not required, thus, it is preferable that the film is fed at a high speed, and while reproducing the magnetic record, a moderate high speed is preferable.

According to the image input method of the present invention, the developed photo film is fed between the feeding side and the winding side and the film image is read by the line sensor, so that the film must be fed more repeatedly than by an area sensor, and the film sometimes must be fed at a high speed. However, PEN, which is hard and has a little winding peculiarity and which is excellent in dynamic intensity and in slidability, is used as the base of the film, therefore, there is an advantage in that the troubles such as jamming and cutting during feeding of the film can be drastically reduced. Further, according to the photo film manufacturing method used in the present invention, the base, which consists of poly-ethylene-naphthalate, is heat-treated more than 50° C. and less than the glass transition temperature for 0.1–1500 hours, so that the photo film can be made hard to reduce a winding peculiarity.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. In a film image input method comprising film feeding means for feeding a roll of a developed film for still photography, the film being loaded between a feeding section and a winding section, and an image sensor for reading a film image while the film is fed by said film feeding means, detecting a photographing environment of every frame of the film in accordance with image data read by said image sensor during a first feeding of the film, and adjusting the read image data of a desired frame of the film in accordance with the detected photographing environment of the desired frame through said image sensor during a second feeding after detecting said photographing environment, a base of the film used in the film image input system comprising poly-ethylene-naphthalate, the photographing environment being a brightness of every frame, an exposure of said image sensor during reading of a frame as the desired frame being controlled based upon the brightness of the frame.

2. The film image input method as set forth in claim 1, wherein a magnetic record layer is formed on the film and information recorded in the magnetic record layer is read during the first feeding of the film.

3. The film image input method as set forth in claim 1, wherein the film is stored in a film cartridge having a single spool, and when said film cartridge is set, said film feeding means drives said spool of said film cartridge whereby a leader portion of the film is fed to a position where a capstan for film feeding is placed, thereafter, the film is fed by said capstan at a predetermined speed and said leader portion of the film is wound around a winding axis at said winding section so as to load the film.

4. The film image input method of claim 1, wherein said image sensor is a line sensor.

5. In a film image input method comprising film feeding means for feeding a roll of a developed film for still photography, the film being loaded between a feeding section and a winding section, and an image sensor for reading a film image while the film is fed by said film feeding means, detecting a photographing environment of every frame of the film in accordance with image data read by said image sensor during a first feeding of the film, and adjusting the read image data of a desired frame of the film in accordance with the detected photographing environment of the desired frame through said image sensor during a second feeding after detecting said photographing environment, a base of the film used in the film image input system comprising poly-ethylene-naphthalate, the photographing environment being a white balance condition of every frame, a white balance of image data of a frame being adjusted during reading of the frame as the desired frame based on the white balance condition of the frame.

6. The film image input method of claim 5, wherein said image sensor is a line sensor.

7. In a film image input method comprising film feeding means for feeding a roll of a developed film for still photography, the film being loaded between a feeding section and a winding section, and an image sensor for reading a film image while the film is fed by said film feeding means, detecting a photographing environment of every frame of the film in accordance with image data read by said image sensor during a first feeding of the film, and adjusting the read image data of a desired frame of the film in accordance with the detected photographing environment of the desired frame through said image sensor during a second feeding after detecting said photographing environment, a base of the film used in the film image input system comprising poly-ethylene-naphthalate, a heat treatment at more than 50° C. and less than a glass transition temperature of the base being applied to the base of the film for 0.1–1500 hours.

8. The film image input method of claim 3, wherein said image sensor is a line sensor.

9. A method of processing developed film of still photography using a film image input system comprising the steps of:

a) reading image information from frames of the film and film information recorded in a magnetic layer of the film during winding of the film and then subsequently rewinding the film;

b) reading image information from frames of the film during winding of the film subsequent said step a) to form index images based on the image information and the film information read during said step a) and then subsequently rewinding the film;

c) reading desired frames of image information, as selected from the index images, during winding of the film subsequent said step b) and then subsequently rewinding the film; and d) recording new film information in the magnetic layer of the film during winding of the film subsequent said step c) and then subsequently rewinding the film, a base of the film comprising poly-ethylene-naphthalate.

10. The method of processing developed film of claim 9, wherein the base of the film is heat treated at more than 50° C. and less than a glass transition temperature of the base for 0.1–1500 hours.

11. The method of processing developed film of claim 9, wherein automatic exposure information is generated based upon the image information read in said step a), an aperture of the film image input system being controlled during said step b) in accordance with the automatic exposure information.

12. The method of processing developed film of claim 9, wherein white balance information is generated based upon the image information read in said step a), a white balance condition of the film image input system being controlled during said step b) in accordance with the white balance information.

13. A method of processing developed film of still photography using a film image input system comprising the steps of:

a) reading image information from frames of the film and film information recorded in a magnetic layer of the film during winding of the film;

b) reading image information from frames of the film during rewinding of the film subsequent said step a) to form index images based on the image information and the film information read during said step a);

c) reading desired frames of image information, as selected from the index images, during winding of the film subsequent said step b); and d) recording new film information in the magnetic layer of the film during rewinding of the film subsequent said step c), wherein a base of the film comprises poly-ethylene-naphthalate.

14. The method of processing developed film of claim 13, wherein the base of the film is heat treated at more than 50° C. and less than a glass transition temperature of the base for 0.1–1500 hours.

15. The method of processing developed film of claim 13, wherein automatic exposure information is generated based upon the image information read in said step a), an aperture of the film image input system being controlled during said step b) in accordance with the automatic exposure information.

16. The method of processing developed film of claim 13, wherein white balance information is generated based upon the image information read in said step a), a white balance condition of the film image input system being controlled during said step b) in accordance with the white balance information.

* * * * *